Oct. 2, 1923.
J. P. CROWLEY
1,469,383
METHOD OF AND APPARATUS FOR PRODUCING CONTINUOUS SHEET GLASS
Filed June 20, 1921
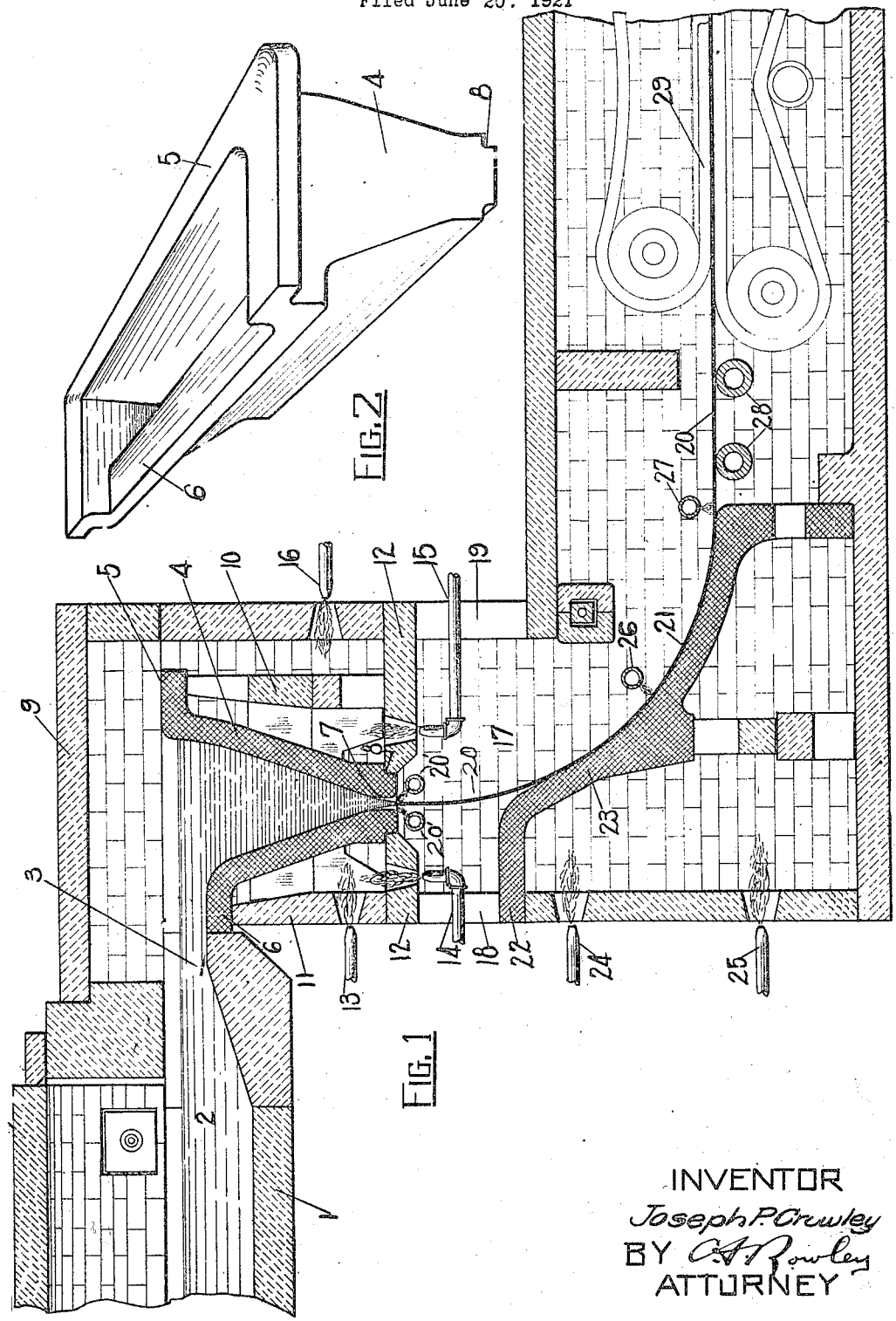
INVENTOR
Joseph P. Crowley
BY C. H. Rowley
ATTORNEY Patented Oct. 2, 1923.

1,469,383

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

METHOD OF AND APPARATUS FOR PRODUCING CONTINUOUS SHEET GLASS.

Application filed June 20, 1921. Serial No. 478,789.

*To all whom it may concern:*

Be it known that I, JOSEPH P. CROWLEY, a citizen of the United States, residing at Toledo, in the county of Lucas and State of Ohio, have invented new and useful Improvements in Methods of and Apparatus for Producing Continuous Sheet Glass, of which the following is a specification.

This invention relates to a new process and apparatus for producing continuous sheet glass, and is, more particularly, an improvement in the art of flowing molten glass into sheet form.

The failure of previous attempts to flow glass downwardly through a slotted former, have been largely due to the tendency of the hot glass to adhere to the walls of the container, and the sides of the slot, and as this glass cools it forms so-called "dog-metal," which obstructs the opening and causes lines and other defects in the sheet.

In the present invention, the above difficulty is largely obviated, by forming the slotted hopper or receptacle, through which the molten glass flows into sheet form, of graphite-clay or a similar composition, to which the hot glass will not adhere, but over which it freely slides without injury to the surfaces of the molten glass as it takes sheet form.

A further object of the invention is to provide a device for directing the downwardly moving sheet into a horizontal plane, for convenience in flattening and further handling. This device is also formed of a heated slab of graphite-clay which has an upper concave surface over which the hanging arc of the sheet may slide without being scratched or otherwise injured.

The invention will be more clearly understood from the following detailed description of an apparatus well adapted to carry out the principles of the invention.

In the accompanying drawings:

Fig. 1 is a longitudinal vertical section through the main portions of the apparatus.

Fig. 2 is a perspective of the former or hopper.

At 1 is indicated the end of the refining tank of a continuous tank furnace, the molten glass 2 flowing out therefrom at 3, into the stationary hopper or former 4. This hopper, which is of the general form shown in Fig. 2, comprises an upper supporting ledge 5, extending around three sides at the upper edge, the fourth side being open at 6 to form an inlet for the flowing molten glass. The sides of the hopper converge downwardly till the space therein terminates in a long narrow slot 7 through the bottom. The lower edge of the hopper is rabbeted at 8 to form a second supporting ledge for the container or hopper.

This hopper is preferably made from a composition known as graphite-clay, being, as the name implies, a mixture of clay and graphite. The smoothness and lubricating qualities of this material is contributed by the graphite, the clay being combined in sufficient quantities to give the requisite strength to the composition. This material has great heat-resisting qualities, and, when highly heated, the graphite content will gather on the surfaces, forming a smooth, non-scratching surface to which molten glass does not adhere. Also, the glass, even when partly cooled and set into sheet form, will slide freely over this graphite surface without injury. Consequently, there is no tendency for the glass to stick and accumulate at the outlet slot 7.

The hopper or former is housed-over at 9, and is supported by the side walls 10 and 11, on which rest the ledge 5 and inlet 6, respectively. The lower edges of the hopper also rest upon the bottom walls 12, which project into the rabbets 8, already described. Suitable burners such as 13, 14, 15 and 16 supply heat to the enclosing spaces between the outer walls and the hopper, to maintain the hopper and the molten glass therein at the requisite temperature. The housing 9 above the hopper is heated from the furnace itself, also by the burners 16. Further burners may be used above the glass, in housing 9, if found necessary.

The supporting structure 17, below the mechanism just described, is open at the ends, as at 18 and 19, to permit the outer air to cool and partially set the flowing stream of glass 20 into sheet form as it emerges from the slot 7. A pair of burners 20', play their flames across the faces of the emerging sheet directly below the slot 7 to fire-polish the sheet as it emerges from the hopper. Coolers, either air or water, may also be used at the sides of the sheet 20, below slot 7, to accelerate the setting of the sheet, although the contact of the outer air through passages 18 and 19 will ordinarily be sufficient.

Since it is usually more convenient to handle the formed sheet in a horizontal plane, mechanism is here disclosed for deflecting the downwardly flowing sheet into a horizontal plane. The still plastic sheet 20 is bent through a natural arc as at 21, and drawn off through a suitable drawing and flattening mechanism 29 which may be of the general form now used in the well-known Colburn process of drawing sheet glass, as disclosed, for example, in the patent to I. W. Colburn, 1,248,809, granted Dec. 4, 1917.

To support the sheet while passing through the arc 21, a slab of graphite-clay or similar material 22 (preferably the same as the hopper 4), having a concave upper surface as at 23, is employed. The space housed beneath this slab 22, is heated by burners such as 24 and 25, so that the deflecting slab 22 will be maintained at such a temperature that the sheet 20 resting and sliding thereupon will not be cracked or otherwise injured by sudden temperature changes. If found necessary, mild burners may be used above the sheet, as at 26 and 27, to maintain the sheet 20 at the proper temperature, before it passes off over the supporting rolls 28, into the drawing and flattening mechanism 29.

The sheet normally will bend through the arc 21, without any supporting means being necessary, but the sheet may at any time rest lightly upon and slide upon the smooth graphite surface of heated slab 22, without being scratched or injured thereby.

The operation of this apparatus is simple and should be obvious from the preceding description. When the temperature of the flowing glass and the speed of the drawing mechanism 29, are properly coordinated, the glass will continuously flow in sheet form from the hopper 4, and after being deflected by the slab 22 into the horizontal plane, be drawn off through drawing and flattening mechanism 29 and pass to the leer and cutting mechanism, not shown.

It is to be understood that the term "graphite-clay" as here used, and as used in the following claims, covers any suitable combination of graphite with a binder to furnish the strength and stability necessary in a structure of this type.

Claims:

1. The method of producing sheet glass by flowing molten glass through a stationary former of graphite-clay.

2. The method of producing sheet glass by flowing molten glass downwardly through a tapered former of graphite-clay.

3. The method of producing sheet glass by flowing sheet glass downwardly through a graphite-clay hopper, and deflecting the sheet into a horizontal plane over a concave surface of graphite-clay.

4. In a glass producing apparatus, a stationary graphite-clay hopper through which the molten glass flows to give it form.

5. In a sheet glass producing apparatus, a graphite-clay hopper having a tapered slot, through which the molten glass flows.

6. In a sheet glass producing apparatus, a source of molten glass, a graphite-clay hopper into which the glass flows from the source, there being a slot in the bottom of the hopper through which the glass flows in sheet form.

7. In a sheet glass producing apparatus, a source of molten glass, a graphite-clay hopper into which the glass flows from the source, there being a slot in the bottom of the hopper through which the glass flows in sheet form, and means for heating the hopper.

8. In a sheet glass producing apparatus, a source of molten glass, a graphite-clay hopper into which the glass flows from the source, there being a slot in the bottom of the hopper through which the glass flows in sheet form, means for heating the hopper, and heaters at the sides of the sheet as it emerges from the hopper.

9. In a sheet glass producing apparatus, a source of molten glass, a graphite-clay hopper into which the glass flows from the source, there being a slot in the bottom of the hopper through which the glass flows in sheet form, and a curved graphite-clay slab below the hopper for deflecting the sheet into a horizontal plane.

10. In a sheet glass producing apparatus, a source of molten glass, a graphite-clay hopper into which the glass flows from the source, there being a slot in the bottom of the hopper through which the glass flows in sheet form, and a graphite-clay slab below the hopper, having a concave outer surface for deflecting the sheet into a horizontal plane.

11. In a sheet glass producing apparatus, a source of molten glass, a graphite-clay hopper into which the glass flows from the source, there being a slot in the bottom of the hopper through which the glass flows in sheet form, a curved graphite-clay slab below the hopper for deflecting the sheet into a horizontal plane, and drawing mechanism for carrying away the sheet.

12. In a sheet glass producing apparatus, a source of molten glass, a graphite-clay hopper into which the glass flows from the source, there being a slot in the bottom of the hopper through which the glass flows in sheet form, a graphite-clay slab below the hopper, having a concave outer surface for deflecting the sheet into a horizontal plane, and drawing and flattening mechanism for carrying away the sheet.

Signed at Toledo, in the county of Lucas, and State of Ohio, this 18th day of June, 1921.

JOSEPH P. CROWLEY.